Figure 1:
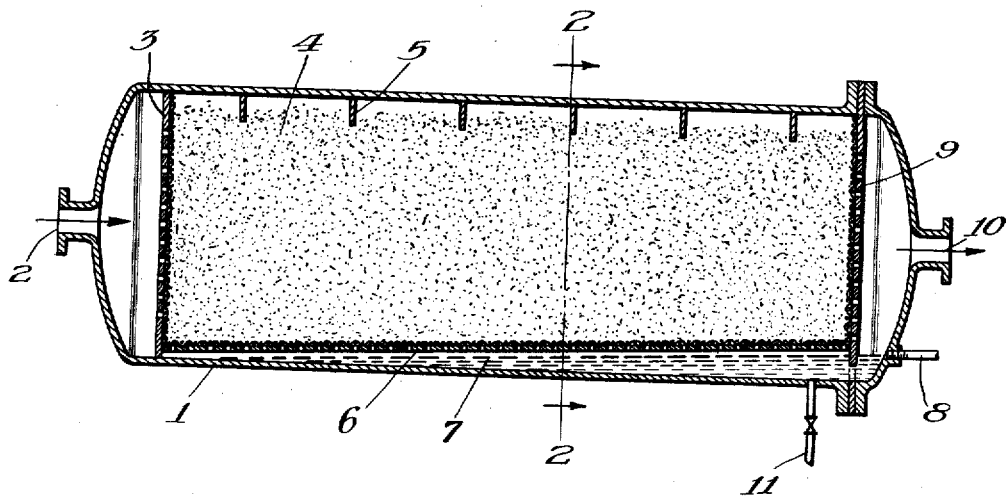

Nov. 14, 1933.   A. G. CONNOLLY   1,934,968
TREATMENT OF HYDROCARBON OILS
Filed Jan. 6, 1932

Witness:
Stephen V. Rebora

Inventor:
Arthur G. Connolly,
By Frank L. Belknap
Atty.

Patented Nov. 14, 1933

1,934,968

UNITED STATES PATENT OFFICE 1,934,968

TREATMENT OF HYDROCARBON OILS

Arthur G. Connolly, Chicago, Ill., assignor to Universal Oil Products Company, Chicago, Ill., a corporation of South Dakota Application January 6, 1932. Serial No. 584,954

1 Claim. (Cl. 196—96)

This invention relates to the treatment of hydrocarbon oils and more particularly refers to the refining of hydrocarbons by treatment of vapors with polymerizing material to remove deleterious and objectionable constituents therefrom, such as those which produce color, odor and gum.

Vapor-phase treatment of hydrocarbon distillates to improve their quality particularly with respect to gum content, color, odor and stability is now well recognized in the oil refining industry. In a widely known method of treating hydrocarbon distillates in the vapor-phase, the vapors to be treated are passed downward through a bed of treating or polymerizing material, such as contact clay, diatomaceous earth, fuller's earth and the like. Polymers formed therein, together with any condensed material, flow downward concurrently with the flow of vapor from the points at which they are formed to the bottom of the bed of treating material. The polymers and liquid condensate are then separated from the treated vapors by gravity. The treated vapors are passed through a knockout drum or tower wherein any entrained polymers are removed, the polymer-free vapors being condensed and collected. The polymers and liquid condensate pass to a polymer receiver, from which they may be returned to the system.

Due to the fact that the refining action of the treating material upon the hydrocarbon vapors is essentially a surface phenomenon, the presence of polymerized products prevents contact between vapors and treating material to a considerable extent and thereby greatly reduces the efficiency of the treating material. This is especially true in the usual method of treatment, where the polymerizing material in the lower part of the treating tower is subjected to contact with a continuous stream of polymerized products formed in the upper portion of said tower. The heavy polymerized products passing over the treating material in the lower portion of the tower block the minute pores and cover the surface of this material to such an extent that it is rendered practically useless. To make the matter worse the effect is cumulative, so that the vapors as they flow downward instead of being met by more active material are met by treating material which is constantly becoming more and more inert.

The present invention provides an improvement in this method of treating whereby the surface of the treating material is maintained substantially free of polymers thereby greatly increasing its efficiency.

The improvement provided by the present invention comprises passing the vapors to be treated through a substantially horizontal chamber of relatively small depth with respect to its length wherein the treating material is disposed, in order that polymers formed will immediately gravitate to the bottom of the chamber, suitable means are provided to maintain the flow of said vapors in a substantially horizontal direction and to permit intimate contact of vapors and treating material and rapid removal of polymers and liquid condensate substantially as soon as they are formed. It is obvious that by this improved method of treating, polymers and liquid condensate are removed from the treating zone almost as soon as they are formed, thereby permitting the treating material to be maintained in a high state of activity, which results in the production of a product having much better color, odor, stability and lower gum content than can be obtained by the present method of treatment.

It is understood that the scope of the present invention is not limited to any specific type or species of polymerizing materials but may include the treatment of vapors with any suitable polymerizing materials such as fuller's earth, diatomaceous earth, contact clay or any other suitable non-metallic or metallic polymerizing agent, or mixtures of the same, and the principles of the invention are not to be confined to the particular type of treatment hereinbefore or hereinafter described, nor to any other specific method of treatment. A specific method of carrying out this process is illustrated in the accompanying diagrammatic drawing, and will be described in the following paragraph.

Referring to the drawing, Fig. 1 is a cross sectional side elevation of a treating chamber, illustrating one means for carrying out the improvements embodied in the present invention.

Figure 2:
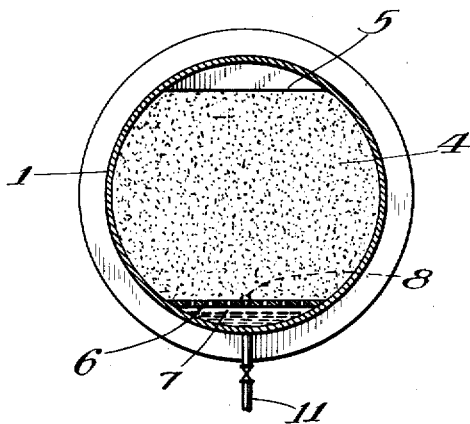

Fig. 2 is a cross sectional elevation view of the same treating chamber taken along a plane indicated by line 2—2 in Fig. 1.

The outer shell of the treating chamber is indicated by 1. The vapors to be treated, which may be cracked hydrocarbon vapors or any other oil vapors which require treatment to improve their properties, particularly with respect to gum content, color, odor and stability, may be introduced to the treating chamber through inlet 2. These vapors then pass through perforations in plate 3 into the treating material 4. Channelling or by-passing of the treating material is prevented by a plurality of baffles 5 disposed throughout the upper portion of the chamber, where they fit tightly against the inner wall of said chamber and extend well into the treating material. As the vapors flow in a substantially horizontal direction through the treating material the deleterious constituents are polymerized by contact with said material and, in company with any condensate which may form, descend through the treating zone, through perforations in plate 6 into the polymer channel 7. Polymers and liquid condensate may be withdrawn continuously or intermittently through line 8. The treated vapors pass through perforations in plate 9 and are withdrawn through line 10. Polymers may be drained from the chamber through line 11 at the completion of the run.

The process of the present invention may be carried out under any desired pressure ranging from substantially atmospheric to relatively high super-atmospheric pressures of several hundred pounds or more per square inch. The pressure maintained in the treating chamber preferably is substantially the same as that in the fractionating tower or other refining step immediately preceding said chamber. For example if the fractionating tower which precedes the treating chamber is operated under a super-atmospheric pressure of 150 pounds per square inch, the treating chamber is preferably maintained under substantially the same pressure, allowance being made for the small pressure drop which necessarily takes place between these two steps in the refining process. As a rule substantially super-atmospheric pressures are preferred for the vapor-phase treatment of distillates and particularly cracked distillates as it has been found that the utilization of such pressure will ordinarily greatly prolong the treating life of the clay or other treating material, making it possible to treat a larger amount of vapors with the same amount of treating material, consequently greatly reducing the expense of operation.

As a specific example of the advantages which may accrue from the operation of the process of the present invention as compared with ordinary vapor-phase treating methods, let us assume that the oil to be treated comprises a distillate in the form of vapors from the fractionating tower of a cracking process, boiling substantially within the range of motor fuel and having a gum content of approximately 300 mgs. per 100 cc., a yellow color, and of poor gum and color stability even after the usual liquid phase, chemical treatment. By subjecting these vapors to the usual vapor-phase treatment whereby said vapors are passed downwards through a bed of fuller's earth, this treatment being described in more detail in the preliminary part of this application, the treated vapors may be improved to a gum content of approximately 40 mgs. per 100 cc. and a 27 color, and may have fair color and gum stability on prolonged exposure to sunlight. When operating under relatively low super-atmospheric pressure a ton of treating material may treat approximately 1,500 barrels of distillate before its efficacy is so reduced that it becomes necessary to replace it with new treating material. When the process is operated at substantially high super-atmospheric pressure of the order of 150 pounds per square inch or thereabouts it may be possible to treat as much as 2,500 barrels of distillate with a ton of clay before it becomes necessary to renew said clay.

By employing the improved method of the present invention the efficiency of the treating material is greatly increased, so that a sample of cracked distillate having the same initial characteristics and similar in all other respects to the distillate described in the preceding paragraph, will be refined to such an extent that the gum content of the treated product is reduced to 15 mgs. per 100 cc., and the color is 30+, color and gum stability being much better than in the case of the sample refined by the usual method and permitting prolonged exposure to sunlight for a much longer period of time before any indication of color or gum formation is noticed. When operating under relatively low super-atmospheric pressures and at temperatures between 400° F. and 450° F. a ton of treating material may treat approximately 3,500 barrels of distillate before it becomes necessary to replace it with new material. When operating under substantially high super-atmospheric pressures of the order of 150 pounds per square inch or thereabout a ton of treating material will treat 6,500 barrels of distillate before it becomes necessary to replace it with new treating material.

I claim as my invention:

A process for refining hydrocarbon vapors which comprises passing the same in a substantially horizontal direction through a horizontally elongated treating zone containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space.

ARTHUR G. CONNOLLY.

DISCLAIMER 1,934,968.—*Arthur G. Connolly*, Chicago, Ill. TREATMENT OF HYDROCARBON OILS. Patent dated November 14, 1933. Disclaimer filed August 22, 1935, by the patentee, the assignee, *Universal Oil Products Company*, consenting.

Hereby enters this disclaimer to that part of the claim in said specification which is in the following words, to wit:

"1. A process for refining hydrocarbon vapors which comprises passing the same in a substantially horizontal direction through a horizontally elongated treating zone containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space."

[*Official Gazette September 17, 1935.*]

vented by a plurality of baffles 5 disposed throughout the upper portion of the chamber, where they fit tightly against the inner wall of said chamber and extend well into the treating material. As the vapors flow in a substantially horizontal direction through the treating material the deleterious constituents are polymerized by contact with said material and, in company with any condensate which may form, descend through the treating zone, through perforations in plate 6 into the polymer channel 7. Polymers and liquid condensate may be withdrawn continuously or intermittently through line 8. The treated vapors pass through perforations in plate 9 and are withdrawn through line 10. Polymers may be drained from the chamber through line 11 at the completion of the run.

The process of the present invention may be carried out under any desired pressure ranging from substantially atmospheric to relatively high super-atmospheric pressures of several hundred pounds or more per square inch. The pressure maintained in the treating chamber preferably is substantially the same as that in the fractionating tower or other refining step immediately preceding said chamber. For example if the fractionating tower which precedes the treating chamber is operated under a super-atmospheric pressure of 150 pounds per square inch, the treating chamber is preferably maintained under substantially the same pressure, allowance being made for the small pressure drop which necessarily takes place between these two steps in the refining process. As a rule substantially super-atmospheric pressures are preferred for the vapor-phase treatment of distillates and particularly cracked distillates as it has been found that the utilization of such pressure will ordinarily greatly prolong the treating life of the clay or other treating material, making it possible to treat a larger amount of vapors with the same amount of treating material, consequently greatly reducing the expense of operation.

As a specific example of the advantages which may accrue from the operation of the process of the present invention as compared with ordinary vapor-phase treating methods, let us assume that the oil to be treated comprises a distillate in the form of vapors from the fractionating tower of a cracking process, boiling substantially within the range of motor fuel and having a gum content of approximately 300 mgs. per 100 cc., a yellow color, and of poor gum and color stability even after the usual liquid phase, chemical treatment. By subjecting these vapors to the usual vapor-phase treatment whereby said vapors are passed downwards through a bed of fuller's earth, this treatment being described in more detail in the preliminary part of this application, the treated vapors may be improved to a gum content of approximately 40 mgs. per 100 cc. and a 27 color, and may have fair color and gum stability on prolonged exposure to sunlight. When operating under relatively low super-atmospheric pressure a ton of treating material may treat approximately 1,500 barrels of distillate before its efficacy is so reduced that it becomes necessary to replace it with new treating material. When the process is operated at substantially high super-atmospheric pressure of the order of 150 pounds per square inch or thereabouts it may be possible to treat as much as 2,500 barrels of distillate with a ton of clay before it becomes necessary to renew said clay.

By employing the improved method of the present invention the efficiency of the treating material is greatly increased, so that a sample of cracked distillate having the same initial characteristics and similar in all other respects to the distillate described in the preceding paragraph, will be refined to such an extent that the gum content of the treated product is reduced to 15 mgs. per 100 cc., and the color is 30+, color and gum stability being much better than in the case of the sample refined by the usual method and permitting prolonged exposure to sunlight for a much longer period of time before any indication of color or gum formation is noticed. When operating under relatively low super-atmospheric pressures and at temperatures between 400° F. and 450° F. a ton of treating material may treat approximately 3,500 barrels of distillate before it becomes necessary to replace it with new material. When operating under substantially high super-atmospheric pressures of the order of 150 pounds per square inch or thereabout a ton of treating material will treat 6,500 barrels of distillate before it becomes necessary to replace it with new treating material.

I claim as my invention:

A process for refining hydrocarbon vapors which comprises passing the same in a substantially horizontal direction through a horizontally elongated treating zone containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space.

ARTHUR G. CONNOLLY.

DISCLAIMER 1,934,968.—*Arthur G. Connolly*, Chicago, Ill. TREATMENT OF HYDROCARBON OILS. Patent dated November 14, 1933. Disclaimer filed August 22, 1935, by the patentee, the assignee, *Universal Oil Products Company*, consenting.

Hereby enters this disclaimer to that part of the claim in said specification which is in the following words, to wit:

"1. A process for refining hydrocarbon vapors which comprises passing the same in a substantially horizontal direction through a horizontally elongated treating zone containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space."

[*Official Gazette September 17, 1935.*]

DISCLAIMER 1,934,968.—*Arthur G. Connolly*, Chicago, Ill. TREATMENT OF HYDROCARBON OILS. Patent dated November 14, 1933. Disclaimer filed August 22, 1935, by the patentee, the assignee, *Universal Oil Products Company*, consenting.

Hereby enters this disclaimer to that part of the claim in said specification which is in the following words, to wit:

"1. A process for refining hydrocarbon vapors which comprises passing the same in a substantially horizontal direction through a horizontally elongated treating zone containing a bed of polymerizing agent and having a space maintained free of solid in the lower portion thereof, the bottom of said bed being inclined upwardly in the direction of flow of the vapors through the treating zone, exposing the vapors to contact with the polymerizing agent during their flow through the treating zone, permitting resultant liquid products to drain downwardly by gravity from said bed into said space in the lower portion of the treating zone, and removing the liquid products from said space."

[*Official Gazette September 17, 1935*.]